(12) United States Patent
Gordon

(10) Patent No.: US 7,945,481 B1
(45) Date of Patent: May 17, 2011

(54) SYSTEM AND METHOD FOR A TWO PHASE ONLINE AUCTION

(75) Inventor: Raz Gordon, Hadera (IL)

(73) Assignee: Collage Analytics LLC, Brooklyn, NY (US)

( * ) Notice: Subject to any disclaimer, the term of this patent is extended or adjusted under 35 U.S.C. 154(b) by 0 days.

(21) Appl. No.: 12/984,605

(22) Filed: Jan. 5, 2011

Related U.S. Application Data

(63) Continuation of application No. 12/984,604, filed on Jan. 5, 2011, which is a continuation of application No. 11/458,427, filed on Jul. 19, 2006.

(60) Provisional application No. 60/595,596, filed on Jul. 19, 2005.

(51) Int. Cl.
*G06Q 30/00* (2006.01)

(52) U.S. Cl. ............................................... 705/26

(58) Field of Classification Search .................. 705/26, 705/27
See application file for complete search history.

(56) References Cited

U.S. PATENT DOCUMENTS

2007/0055606 A1* 3/2007 Ausubel et al. ................. 705/37

\* cited by examiner

*Primary Examiner* — Mila Airapetian

(57) ABSTRACT

A commerce system and methods thereof, comprising a remote server accessible via a network by client computers utilizing client software such as browsers for interfacing with the remote server. A server receives item information from a seller for listing of an item in an auction process associated with an end time, receives a first group of one or more proxy bids for the item during a first time period, receives a second group of one or more actual bids for the item during a second time period prior to the end time and determines at the end time a highest actual bid as a winning bid.

2 Claims, No Drawings

SYSTEM AND METHOD FOR A TWO PHASE ONLINE AUCTION

CROSS REFERENCE TO RELATED APPLICATIONS

This application is a continuation of U.S. patent application Ser. No. 12/984,604, filed Jan. 5, 2011, entitled "System and method for dynamic online auctions", which is a continuation of U.S. patent application Ser. No. 11/458,427, filed Jul. 19, 2006, entitled "System and Method for Facilitating Network Based Commerce", which claims the benefit under 35 USC §119(e)(1), to the filing date of U.S. provisional patent application Ser. No. 60/595,596, entitled "System and Method for Facilitating Network Based Commerce", filed on Jul. 19, 2005. Each of the aforementioned patent applications is hereby incorporated herein by reference in its entirety.

BACKGROUND OF THE INVENTION

The present invention relates to network based commerce systems. Network based commerce systems enable sellers to submit information about their products and wares to a central server, thereby making it widely accessible to potential buyers communicating with the server. The information submitted by the sellers is organized, stored and presented to buyers as a database of listings, which may then be easily browsed and searched by the buyers. Network based commerce systems employ multiple price setting mechanisms for pricing items listed in the database. One price setting mechanism is the seller-fixed price. The seller-fixed price is published along with the item listing information, and a transaction may be automatically executed by a buyer agreeing to purchase the item for that price.

An auction price-setting mechanism is also commonly used for establishing a market price for a listed item. A listed item being sold under the auction model, would be published as such, and would include specific auction details, such as minimum bid price, auction end date, etc. Bidders browsing auction items may submit bids, and compete against other bidders that are bidding for the same item. Typically, at the auction end date, the highest bidder wins the item.

A third pricing-setting mechanism is the buyer-proposed price. A potential buyer interested in a particular listed item would submit an offer consisting of an amount he's willing to pay for the item. The offer is then communicated to the seller, which either accepts or rejects the offer. The seller generally has the option of immediately executing on the buyer proposed-offer, thereby immediately effectuating a transaction between the buyer proposing the offer and the seller.

A particular challenging aspect in existing network-based commerce systems is the ability to employ two or more pricing mechanisms for a single item. Different pricing methods appeal to different buyers and it would be desirable to have them simultaneously available for the same items.

SUMMARY OF THE INVENTION

Described herein is a commerce system and methods thereof, which comprises a remote server accessible via a network by client computers utilizing client software such as browsers for interfacing with the remote server. The server provides a commerce system that enables sellers to post information of items for sale, and for buyers to view the seller-provided information and to transmit purchase requests or bids for listed items. In the preferred embodiments the mechanism for negotiating a final selling price for items listed at the commerce system is facilitated through a number of pricing methods, including, seller-fixed price process, auction price-setting process, and buyer-proposed pricing. Multiple novel features and aspects for facilitating pricing of items are described herein with respect to the preferred embodiments. Additional novel features and aspects will be readily understood to one skilled in the relevant art based on the following disclosure.

DETAILED DESCRIPTION

The present invention enhances existing network based commerce systems. In the preferred embodiment of the present invention, the commerce system comprises a remote server accessible via a network (e.g. LAN, WAN, Internet and Intranet) by client computers utilizing client software such as browsers for interfacing with the remote server. The commerce system maintained at the remote server enables sellers to post listing information about items for sale and for buyers to browse and search the listed items and to transmit purchase requests or bids for desired items.

Reference is made to U.S. patent application Ser. No. 10/749,614, entitled "Method and system to publish a seller fixed price offer", filed Dec. 30, 2003. Said application is hereby incorporated herein by reference in its entirety. The novel features and enhancements described herein preferably augment, supplement and/or enhance the commerce systems comprehensively described in the aforementioned application.

In the preferred embodiment of the present invention the mechanism for negotiating a final sale price for items listed in the commerce system is facilitated through a number of pricing methods, including, a seller-fixed price method, an auction price-setting method, and a buyer-proposed price method, all of which are herein described in detail. In addition, described herein are also mechanisms for simultaneously enabling two alternative price-setting methods for a single item.

Seller-Fixed Pricing Method

With the seller-fixed pricing method the seller indicates a desired amount at which he's willing to sell the listed item. A seller interfaces with the commerce system via a client computer and submits a listing request to the commerce system. The seller then transmits complete item information, such as a description of the item, a picture, shipping costs, insurance costs and seller contact information all of which are collected and stored in the commerce system. The commerce system generates instructions offering the seller the option to sell the item using an auction price-setting process and/or a fixed price-setting process. The seller transmits an indication that he wishes to sell the item under the fixed-price setting process and indicates a fixed price at which the item can be purchased. Preferably, the listing is only valid for a specified time period (e.g. 7 days or 30 days), after which the listing expires and is no longer available for view by prospective buyers. Preferably, the system may enable the seller to modify the fixed-price for a pending listed item. The seller may choose to either increase or decrease the price for the listed item. Typically, a seller may choose to decrease the price for the item when he realizes that the current fixed price will not generate a sale within the valid time period for the listing.

A buyer locates the network-based commerce system by entering the commerce system identifier (e.g., a URL) into the client program running on the buyer's client computer, which transmits the commerce system identifier through the network. The buyer may then interact with the commerce system through a user-friendly interface provided at the buyer's client computer. The buyer navigates the listings of available items stored at the commerce system by utilizing browsing tools and search tools well known in the art. The buyer may view detailed information for each listed item provided by the seller for that item. The buyer may also contact the seller via a special form interface and may submit questions to the seller. If a buyer decides to purchase the item at the indicated seller-fixed price, he may submit a purchase request to the commerce server indicating his willingness to purchase the item at the fixed price. The purchase request is legally binding on both the buyer and the seller, and the commerce system facilitates the completion of a transaction between the buyer and seller for the sale of the listed item at the fixed price.

Auction Price-Setting Method

A seller may also choose to sell an item through a network-based auction. A seller interfaces with the commerce system via a client computer and submits a listing request to the commerce system and selects the option to sell the item through an auction process. The seller also transmits all the relevant listing information, such as a item description, picture, and seller contact information. The seller may also optionally set a minimum bid amount and reserve amount for the item. The minimum bid amount is the minimum bid amount allowed in bidding for the item. The reserve amount indicates that the seller is not bound to sell the item to the winning bidder in the event the auction process ends with the winning bid being equal or lower than the reserve amount. Each auction has a set end-time, which is the date and time (preferably in exact hours and minutes) the auction ends and a winning bid is determined from among the bids received prior to the ending of the auction. The auction end-time is preferably set by the seller that chooses from among several auction times periods (e.g. 2 days, 3 days or 7 days auctions). If no bid is received prior to the end time, the listing expires and the seller may then choose to relist the item and conduct a new auction.

A prospective buyer navigating the listings available at the commerce system may view a listed item being sold through a pending auction. The buyer utilizing his client program may view all relevant auction information, including the minimum bid amount and/or the current bid amount for the listed item. If a reserve price is specified for the item, the commerce system may be configured to either disclose or not to disclose the reserve price to the prospective buyer. The disclosure of the reserve price may also be dependent on seller preference. The commerce system can accept bids from bidders by providing an electronic form associated with the listed item. The commerce system may preferably be configured to accept a bid only if it surpasses the current bid for the item. A bid submitted by a bidder is preferably not cancelable, except in special situations, such as when the bidder mistakenly enters an unreasonably high bid price, or when the seller subsequently changes the item information.

All bids submitted by bidders are preferably proxy bids. With a proxy bid the bidder indicates the highest price he is willing to pay for the item. The commerce system then acts as a proxy and bids on behalf of the proxy bidder a bid amount that is an increment over the current bid. A first received proxy bid in an auction, would cause the new current bid price to be set at an increment above the minimum bid indicated by the seller. If no minimum bid is indicated then the new current bid is set at an increment above 0. The increment may either be a dollar amount (e.g. $0.50), or may be a percentage increase over the previous current bid or minimum bid amount. A subsequent bidder enters a proxy bid, and the system sets the new current bid on behalf of the second bidder at an increment above the previous current bid. The system then automatically conducts competitive bidding among the first and second bidder, and finally sets the current bid on behalf of the bidder with the higher proxy bid, at an increment above the lower proxy bid. In similar fashion multiple proxy bids for an item may be received, with the current bid always being set on behalf of the highest proxy bidder at an increment above the second highest proxy bid. The proxy bid amount of each bidder may or may not be disclosed to the seller and/or other bidders.

At the auction end-date, the highest current bid wins the item. The system determines the winning bidder and sends electronic notification to the seller and the highest bidder, and facilitates buyer/seller communication in order to complete the transaction. Both the seller and the highest bidder are legally bound to complete the transaction.

Hybrid Pricing Method Listings

The commerce system may also allow sellers to list items under both of the above pricing methods, that is, the auction price-setting method and the seller-fixed pricing method. The seller indicates to the commerce system his desire to sell the item through both a seller fixed price and an auction price-setting process. The item is auctioned in the same fashion as described above. However, prior to the auction end-date a buyer may select to terminate the auction process early and send a purchase request to the commerce system to purchase the item at the seller fixed-price. The commerce system may be configured to allow the availability for purchasing the item at the fixed price even when one or more bids have already been received for the auction process, so long as the auction is still pending. Alternatively under a different embodiment of the hybrid method, the system may automatically remove the fixed-price purchase option once a first bid is received in the auction.

Buyer-Proposed Offer Pricing Method

The commerce system may also provide a third pricing method for a listed item. The buyer-proposed price method is initiated by a buyer (i.e. a prospective buyer), which may communicate with the commerce system and indicate the amount he's willing to pay for a listed item. The buyer-proposed price method may be available for all the items listed at the commerce system, including items that are associated with a seller-fixed price and items that are being auctioned through an auction price-setting process. Preferably, a seller may also list an item that neither includes a seller-fixed price and nor is it being sold through an auction, but is being listed, simply to allow prospective buyers to submit proposed offers. According to this method, a buyer indicates a desire to purchase a listed item at a proposed price, thereby negotiating with the seller to buy the item.

The commerce system receives the buyer-proposed offer, and notifies the seller about the offer (e.g., via email, instant messaging, and/or an update of listing information that is available to the seller when he views his listed items).

When the seller receives the notification of the buyer-proposed offer price, the seller may either accept or reject offer. If the seller accepts the proposed price, the seller transmits an indication of acceptance of the offer to the commerce system. If the seller rejects the offer, no action on his part is required, however he may optionally transmit an indication that he rejects the offer, thereby causing the buyer to possibly reconsider his/her proposed price, which may lead to a higher buyer-proposed offer price.

The buyer-proposed offer is preferably cancelable at any time by the buyer prior to acceptance of the offer by the seller. Preferably, each buyer-proposed offer is associated with an expiration date, which is the date and time the offer automatically expires without any action required by the buyer submitting the offer. The expiration date may be available for view by the seller, or alternatively the expiration date is hidden from the seller. If known to the seller, the system may proactively notify the seller about buyer-proposed offers that were not read and are about to expire.

Multiple buyer-proposed offers may be received by the commerce system for a listed item all of which are sent or displayed to the seller. When a seller accepts a proposed offer price of a buyer it legally binds both the seller and the buyer to consummate a sale of the item at the buyer-proposed price.

The commerce system may be configured to provide a buyer with an option to submit multiple proposed offer prices to multiple similar listings and create a conditional offer group. The buyer may submit a single proposed price to all items in the group or may indicate different prices for each item in the group. Each proposed offer is a conditional offer, which is conditioned on the non-execution of another offer in the group. When a seller for one of the items in the group accepts the offer for that item, then all other offers in the group are automatically cancelled. This ensures the buyer that even if he submits multiple offers for multiple items in the group only one offer in the group is executable by a seller. The commerce system facilitates the grouping of buyer offers through a user-friendly interface. When a buyer submits a proposed offer price for an item, he is first prompted with the option of creating a new group with which the offer may be associated with, or he may associate the offer for the item with a previously created group. Under an alternative embodiment the buyer is prompted with a list of previously submitted and still valid offers, and he may then select (e.g. by checking a box near a listing of the list of previous offers) all the previous offers he wishes to be contingent with the currently submitted offer, thus the execution of one offer will cause the automatic cancellation of the other offers.

As indicated above a buyer may submit a proposed offer for an item that is associated with a pending auction. The option for submitting a buyer-proposed offer is preferably available as long as the auction is pending, regardless of whether or not one or more bids have been received for the item. In this embodiment, when a seller executes the buyer's offer, the auction is automatically terminated and the buyer having submitted the offer is the legally bound buyer for the item at the specified offer price. Preferably, the seller may choose which buyer to select as the winning buyer for the item. The seller may thus possibly select a lower offer by another buyer, if he so desires.

In another embodiment when the seller accepts a buyer-proposed offer price it will not necessarily guarantee that buyer as the winner of the item. Rather the system may first mesh the accepted buyer-proposed offer with the pending auction price-setting process. The system will first determine whether or not the highest proxy bid submitted in the auction process is higher than the seller accepted buyer-proposed offer. If the highest proxy bid in the auction process is lower then the accepted buyer-proposed offer, then the highest buyer-proposed offer is the winning buyer. However, if the highest proxy bid is higher then the accepted buyer-proposed offer, then the system will automatically set the winning bid for the highest proxy bidder at an increment above the accepted buyer-proposed offer, and the highest proxy bidder will be selected as the winning bidder and will be bound to purchase the item at the newly set winning bid.

For example, if a highest proxy bidder in the auction process has submitted a proxy bid of $100 for a particular item, and the current bid has been determined by the commerce system at $50, which is an increment above a $45 bid of the second highest proxy bid. Thereafter, for the same item the system also receives a buyer-proposed offer of $80, and sends the offer information to the seller. The seller accepts the offer and sends an indication of acceptance to the commerce system. The system then considers the $80 buyer-proposed offer against the $100 highest proxy bid. The system then chooses the highest proxy bidder as the winning bidder and sets the winning bid price at $85.

Preferably, a proxy bidder may select at the time he submits his bid (or at any time thereafter as long as the bid is valid and the listing is still pending), the option of having his proxy bid considered against a buyer proposed offer in the event the seller accepts the buyer proposed offer. Alternatively, all proxy bids are configured by the commerce system to be considered against a buyer-proposed offer if the seller executes such offer.

In a further alternative embodiment, when a buyer-proposed offer is submitted by a buyer for an item that is being sold via an auction price-setting process, the system will not automatically execute on the offer upon acceptance of the offer by the seller. According to this approach, whenever a seller accepts a buyer-proposed offer for a particular item, an indication of the seller's acceptance is not immediately communicated to the bidder. Instead, the offer is compared to each of the proxy bids received for the item in the auction process. Each bidder that submitted a proxy bid that is higher than the accepted buyer-proposed offer is contacted and receives an option of submitting a buyer-proposed offer of his own within a limited timeframe. At the end of this limited timeframe, the buyer-proposed offers submitted by these bidders and the offer the seller had already accepted, are ranked and the highest offer wins the item (alternatively, the seller may choose which, if any, of the newly submitted offers to accept, but will necessarily be required to accept one offer from among the newly submitted offers and the previously accepted offer). The winning buyer (or selected buyer) is then contacted and a complete transaction is facilitated.

According to this embodiment, the first buyer-proposed offer (that was accepted by the seller and thereby triggered the process of notifying the proxy bidders in the auction process), will preferably not be cancelable by the buyer submitting that offer, although he might not end up winning the item in the event his offer is surpassed by other offers submitted within the limited timeframe. The proxy-bidders that subsequently submit offers within the limited timeframe in order to compete with the first buyer-proposed offer may preferably be allowed to cancel their offers within the limited timeframe period.

A buyer-proposed offer may be explicitly accepted or rejected by the seller, or alternatively the seller may simply ignore the offer. As noted above, the buyer may manually cancel the offer at any time, or may set an expiration date for the offer to expire automatically. In one embodiment, an offer which has been not been accepted by the seller, and has not been cancelled by the buyer, may preferably be automatically converted into a proxy bid and may be considered in the simultaneously pending auction process. Under such configuration a buyer-proposed offer that is still pending at the auction end-time, will automatically be converted to a proxy bid and will be considered against the other proxy bids in the auction process. The buyer may preferably select or deselect the option of configuring the offer as being convertible into a proxy bid.

The commerce system may provide the seller with an auto-response feature, for automatically responding to buyer-proposed offers. The seller's auto-response may include the following sub-features. (a) The seller may indicate a minimum buyer-proposed offer that it will consider. Offers that are below this minimum will automatically be rejected by the system on behalf of the seller. (b) The seller may indicate a price at which the commerce will automatically accept the offer on behalf of the seller. This feature may include a "wait period", prior to the system's acknowledgment of an acceptance of the offer. The "wait-period" may be optional, and its duration may be set by the seller. If subsequent buyer-proposed offers are received during the wait period, the system may be configured to automatically restart the wait period, starting from the receipt of the latest buyer-proposed offer.

Sniping Prevention Methods

Network based auction systems often suffer from a phenomenon commonly referred to as "sniping bids". Sniping bids are last-minute bids that are intended to outbid offline users who cannot raise their proxy bid and therefore lose the win they could otherwise have. The following methods fight sniping by creating an incentive for buyers to bid early on. Each of these methods may be used alone or together with other methods.

Method 1: Convertible Proxy Bid. According to this method, a bidder that has submitted a proxy bid to the auction process for a particular item may be provided a feature for attaching "conversion conditions" to his proxy bid. When these conditions are met the proxy bid will automatically be converted into a buyer-proposed offer and would be handled by the commerce system much in the same way as the system handles other buyer-proposed offers as described above.

The conditions attached by the bidder may include the following: (1) a certain time period before the auction ends; (2) the highest bid has reached a certain threshold (i.e. the highest current bid in the auction process has surpassed a threshold bid set by the bidder). When any (or all) of these conditions are met the commerce system will automatically convert the proxy bid to a buyer-proposed offer equal to the proxy bid price. The commerce will then proceed with one of the methods previously described for communicating and processing such buyer proposed offers. If the offer is rejected or a response is not received within a given time period, the offer may be converted back to a proxy bid, and will proceed under the auction process. Preferably, a bidder using this conversion feature may not cancel the offer, even when it is under the buyer-proposed offer status.

Method 2: Late Bidder Charge. The idea behind this method is to make late bidding/winning more expensive and thereby degrade the competitiveness of the late bidder. This encourages the bidder to bid early on, and penalizes "snipers".

Proxy bids that are submitted within a specified time period prior to the end of the auction will be subject to a special charge. This charge will generally not be considered for comparison with the other proxy bids but is rather treated as an additionally applied fee.

The amount charged may be determined by the following methods: (1) fixed Fee: a "late bidding fee", which applies to all bids submitted within a predefined time period prior to the auction end time; (2) sliding Fee: a "late bidding fee", which increases as the submittal time of the bid is closer to the auction end time.

The Late Bidder Charge may be collected for submitting a late bid (regardless of whether the bid will win or not), or may be charged only if the bids ultimately wins the auction.

The amount accrued from Late Bidder Charges may be used in any of the following ways: (1) Used to improve the highest early bid: the charges collected are added to the proxy bid of the bidder that had the highest early bid (an early bid is such which was submitted early enough and is not subject to Late Bidder Charges). This is practical only when Late Bidder Charges are collected for submitting a late bid, even if the Late Bidder does not actually win the auction. When sniping is heavily used (i.e. many late bids are submitted), the highest early bidder gets a big advantage over the late bidder. (2) It may be transferred to the highest early bidder as "sniping compensation"—he/she lost the auction, but at least earned some money. (3) Collected by the auction system. (4) Transferred to the seller.

Method 3: Random Auction End Time. This method makes sniping difficult because the end time of the auction is non-deterministic. The auction system randomizes the end-time within a predefined window, which is wide enough to defeat the sniping effect.

Method 4: Late Bidder Random Delay of Bid Submittal. This method is similar to the Random Auction End Time, but presents the non-deterministic challenge only to the late bidders (early bidders see a deterministic situation). Each late bid (such which is submitted within a predefined time period prior to the auction end time) is assigned a random delay in submitting the bid to the commerce system. The auction system randomizes this delay, and the delay may or may not be presented to the bidder and/or the other participants of the auction. The delay may be longer than the time left for the auction. Therefore, the sniper risks a situation in which his bid will not be considered at all.

Method 5: Idle Auction Early Termination. This method encourages bidders to bid early on in order not to lose the chance to bid. The idea is that if the auction is "idle" for a long period of time (i.e. no new bids are submitted for a long time, or the highest bid was not significantly raised for a long time), the auction system terminates the auction. There may be two kinds of termination: (1) Abort: the auction is withdrawn and no winner is announced. (2) Accept: the highest bidder at the time the auction is terminated is announced the winner.

Method 6: Limited Proxy Bidding. With this method every bid received within a certain time period prior to the end-date of the auction will not be considered as a proxy bid, but will be considered as an actual bid and will be set as the current bid price. For example, the system may be configured such that at 12 hours prior to the end date of the auction proxy bidding will be disabled and all newly entered bids received will be considered as actual bids. This method encourages early bidding because, in order to win, late bidders will have to spend a considerable amount of time in order to follow the developments in the auction and upgrade their bids manually.

The present invention has been described in its preferred embodiments and the various novelty aspects of the present invention may be readily appreciated. Various modifications to the preferred embodiments are envisioned, which may include one or more of the novelty aspects described herein, without departing from the spirit and scope of the invention.

Appended to this specification are one or more claims, which include both independent claims and dependent claims. Each dependent claim refers to a previous claim, and should be construed to incorporate by reference all the limitations of the previous claim to which it refers. Further, each dependent claim of the present application should be construed and attributed meaning as having at least one additional limitation or element not present in the claim to which it refers. In other words, the claim to which each dependent claim refers is to be construed and attributed meaning as being broader than such dependent claim.

What is claimed is:

1. A system comprising a server coupled to a network and configured to:

receive through the network item information from a seller for listing of an item in an auction process implemented in the server, the item information including a description of the item, wherein the auction process is associated with an end time;
receive through the network a first group of one or more bids for the item during a first time period, wherein each of the first group of one or more bids is a proxy bid, wherein the server is configured to set an actual bid on behalf of a highest proxy bid at an increment above a next highest bid;
receive through the network a second group of one or more bids for the item during a second time period prior to the end time, wherein the second time period is subsequent to the first time period, wherein each of the second group of one or more bids is an actual bid, wherein the server is configured not to accept a proxy bid during the second time period; and
determine at the end time a highest actual bid as a winning bid.

2. A method comprising:
receiving at a server coupled to a network item information from a seller for listing of an item in an auction process implemented in the server, the item information including a description of the item, wherein the auction process is associated with an end time;
receiving at the server a first group of one or more bids for the item during a first time period, wherein each of the first group of one or more bids is a proxy bid, wherein the server is configured to set an actual bid on behalf of a highest proxy bid at an increment above a next highest bid;
receiving at the server a second group of one or more bids for the item during a second time period prior to the end time, wherein the second time period is subsequent to the first time period, wherein each of the second group of one or more bids is an actual bid, wherein the server is configured not to accept a proxy bid during the second time period; and
determining in the server at the end time a highest actual bid as a winning bid.

* * * * *